United States Patent [19]

Stewart

[11] 3,780,228

[45] Dec. 18, 1973

[54] AUTOMATIC DISCONNECT CIRCUIT FOR REDUCING DIAL PULSE DISTORTION CAUSED BY SUBSCRIBER CARRIER EQUIPMENT

[75] Inventor: James A. Stewart, Menlo Park, Calif.

[73] Assignee: GTE Automatic Electric Laboratories Incorporated, Northlake, Ill.

[22] Filed: Mar. 1, 1972

[21] Appl. No.: 230,704

[52] U.S. Cl. .......... 179/16 A, 179/2.5 R
[51] Int. Cl. .......... H04h 1/08
[58] Field of Search .......... 179/2.5 R, 26, 16 A

[56] References Cited

UNITED STATES PATENTS

| | | | |
|---|---|---|---|
| 3,510,584 | 5/1970 | Krasin et al. | 179/2.5 R |
| 3,428,756 | 2/1969 | Epstein | 179/16 A |
| 3,639,692 | 2/1972 | Krasin et al. | 179/2.5 R |
| 3,624,300 | 11/1971 | Krasin et al. | 179/2.5 R |

*Primary Examiner*—Kathleen H. Claffy
*Assistant Examiner*—Douglas W. Olms
*Attorney*—K. Mullerheim et al.

[57] ABSTRACT

A local subscriber battery is connected through a battery charging circuit, a disconnect circuit, and a cable pair to a central office talking battery. The disconnect circuit includes a pair of transistor switches that are connected in series between associated lines of the cable pair and the charging circuit for selectively blocking line current to the latter at the start of a dial pulse; a first resistor-capacitor network for detecting initiation of a dial pulse; and a second resistor-capacitor network for controlling the operation of the switches. The second network is responsive to operation of the first network for holding the switches open to prevent charging current flowing on the cable pair for a prescribed time interval after detection of the leading edge of a dial pulse. This ensures that the contacts of the A-pulsing relay in the central office drop out in response to the dial pulse.

13 Claims, 5 Drawing Figures

AUTOMATIC DISCONNECT CIRCUIT FOR REDUCING DIAL PULSE DISTORTION CAUSED BY SUBSCRIBER CARRIER EQUIPMENT

BACKGROUND OF THE INVENTION

This invention relates to subscriber-carrier telephone communication systems and more particularly to circuitry for reducing dial pulse distortion on the physical line circuit when power from a central office talking battery is used to charge a local battery in a self-contained subscriber carrier terminal that is at a location remote from the central office.

The durations of the break and make periods associated with each dial pulse interval are nominally 58 milliseconds and 42 milliseconds (i.e., 58 percent break and 42 percent make), respectively. Dial pulse distortion is a measure of the difference between the time duration of a dial pulse and the times of response thereto by the A-pulsing relay in the central office. It is expressed as the difference between percent break of a physical subscriber's dial contacts and the percent break of the responding A-relay contacts.

A simplified schematic diagram of a typical subscriber-carrier telephone system is illustrated in FIG. 1 if the disconnect circuit 4 is omitted. Such a system includes a circuit 5 for charging a local subscriber battery 6 from a central office talking battery 8 on lines 9 and 10 of a cable pair. The coil windings 12A and 12B of the A-pulsing relay 11 in a line selector of the central office are connected in series with the talking battery 8. The local battery 6 powers the subscriber-carrier equipment including transmitting and receiving circuitry in circuit 7 which is connected to the subscriber-carrier handset 15 comprising dial contacts 16, hook-switch contacts 17, and a ringer 18 having an associated leakage impedance represented by resistor 19. A second subscriber handset 23 comprising dial contacts 24, hook-switch contacts 25, and a ringer 26 having an associated leakage impedance represented by resistor 27 is connected through low-pass filter 13 and lines 29 and 30 to the cable pair lines 9 and 10, respectively. Each additional physical pair subscriber handset 23' (not shown) that is connected across the extensions 9B and 10B of the lines adds a leakage impedance in shunt with the resistor 27, and the net leakage impedance across the cable pair decreases.

The time required for the A-pulsing relay contacts 14 in such a telephone system to open in response to a dial pulse at time $t_1$ (see FIGS. 2 and 3) is a function of the leakage impedance across the lines of the cable pair, as well as the minimum continuous line current from the talking battery. This is because a finite time is required to dissipate energy stored in the central office coil windings 12A and 12B so that the contacts 14 thereof can open. The rate of decay of line current caused by the collapsing magnetic field on the windings 12A and 12B decreases as the net leakage impedance across lines 9 and 10 decreases. Thus, the time for the magnetic field on coil windings 12A and 12B to collapse and for the associated contacts 14 to open in response to a dial pulse increases as the number of physical pair subscriber handsets (i.e., the number of physical pair leakage paths 27 across lines 9 and 10) is increased. The effective value of the net leakage impedance across the physical pair also decreases to cause an increase in the time required for the A-relay contacts 14 to open when a continuous current is drawn from the lines 9 and 10 to charge the local battery 6. Since draining a charging current from lines 9 and 10 and adding physical pair ringers to these lines both decrease the net leakage impedance across the cable pair, the maximum number of physical pair ringers must be reduced when a subscriber carrier battery charging circuit is employed.

Dial pulse distortion is graphically illustrated by the curve in FIG. 2 which represents the voltage across the cable pair as the physical subscriber handset 23 goes off-hook and dials the number 2, and by the curves in FIG. 3 which represent line current in the A-pulsing relay coil windings 12A and 12B. Referring now to the solid curves in FIGS. 2 and 3 and considering that there is no battery charging current or other leakage current on the cable pair when the physical subscriber handset 23 goes off-hook at time $t_0$, the voltage across its hook-switch contacts 25 drops and a current flows on lines 9 and 10 to energize the A-relay 11 and close its contacts 14. When the number 2 is dialed and the physical subscriber dial contacts 24 open at time $t_1$, decay of the magnetic field on coil windings 12A and 12B produces a transient voltage 28 in FIG. 2, having a value that is much greater than the 48 volt talking battery voltage, to maintain the same current flowing in the windings 12A and 12B. As this magnetic field collapses at time $t_1$, the line current decays exponentially to 0 milliampere (as indicated by the solid curve 20 in FIG. 3) through the leakage impedances 27 of the physical ringers. When the line current (curve 20) falls below the 6 milliampere drop-out value of relay 11 at time $t_2$, the contacts 14 thereof open in response to the break point 21 of the first dial pulse interval. In contrast, if a subscriber battery charging current of 4 milliamperes is drawn from lines 9 and 10, the line current at time $t_1$ decays to 4 milliamperes as represented by the dashed curve 22 rather than to 0 milliampere as in curve 20, see FIG. 3. The line current in this case does not fall below the 6 milliampere drop-out valve for the A-relay 11 unit a later time $t_3$. This means that the 4 milliampere subscriber battery charging current drawn from lines 9, 10 delays the opening of the contacts 14 by the time interval $t_3 - t_2$. This decrease in the duration of the dial pulse 21 is an example of dial pulse distortion.

An object of this invention is the provision of a circuit for reducing dial pulse distortion in a subscriber-carrier telephone system including a circuit for charging a local subscriber-carrier battery from the cable pair and central office talking battery.

SUMMARY OF THE INVENTION

In accordance with this invention, dial pulse distortion caused by a subscriber carrier terminal having a local battery that is charged through a cable pair from the central office talking battery is reduced by automatically disconnecting the local battery charging circuit from the talking battery at the start of the off-hook to on-hook transition of a dial pulse and keeping it disconnected for a time interval that is greater than the duration of the voltage transient at the start of the dial pulse and the time interval required for the A-pulsing relay to open.

BRIEF DESCRIPTION OF THE DRAWINGS

This invention will be more fully understood from the following detailed description thereof together with the following drawings in which:

FIGS. 1, 2, and 3 having been previously referred to in describing the background of this invention;

DESCRIPTION OF PREFERRED EMBODIMENTS

Figure 1:
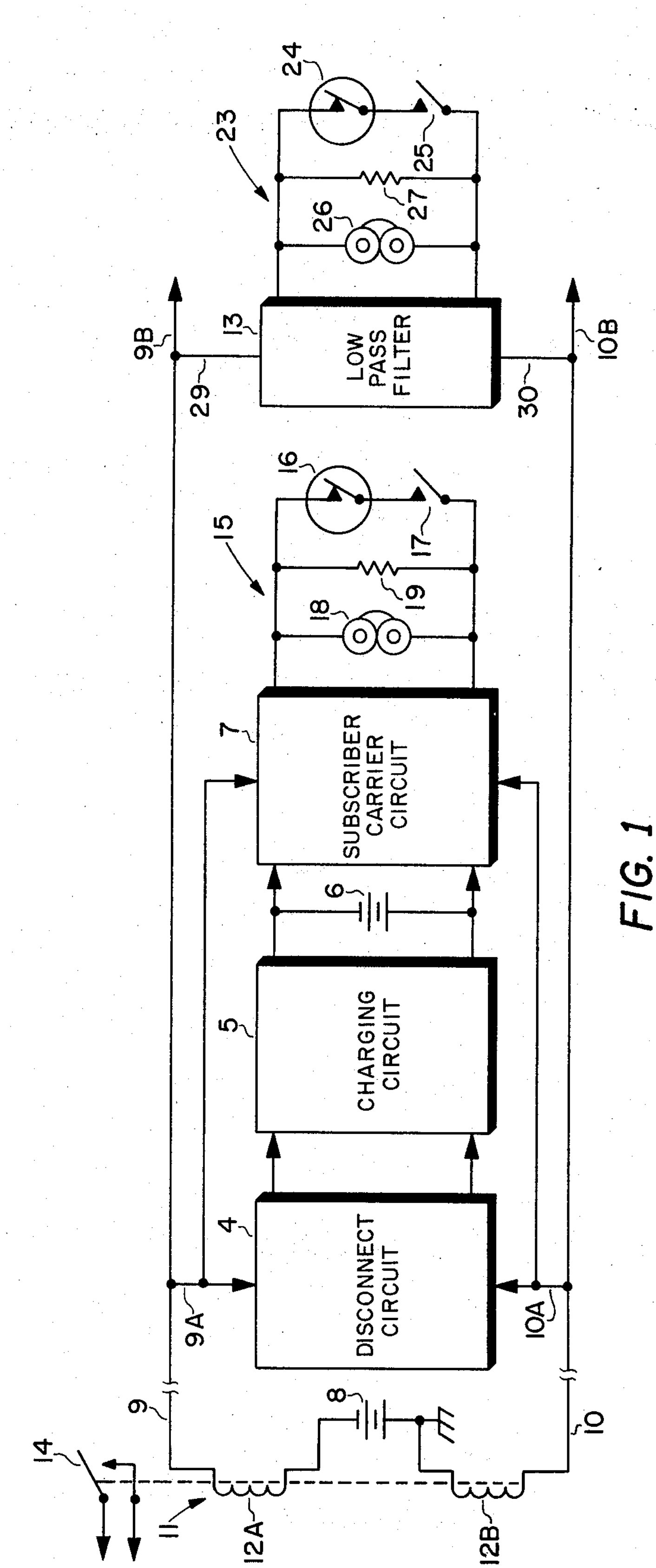
FIG. 1 is a schematic diagram of portions of a telephone system embodying this invention.

Referring now to FIG. 1, in a telephone system embodying this invention central office equipment includes a talking battery 8, an A-pulsing relay 11 having coil windings 12A and 12B and contacts 14, and a cable pair comprising lines 9 and 10; and the subscriber carrier equipment includes disconnect circuit 4, circuit 5 for charging the local battery 6, subscriber carrier circuit 7 including transmitting and receiving circuitry, and a subscriber carrier handset 15. The physical pair subscriber handset 23 comprises the ringer 26 and the series combination of dial contacts 24 and hook-switch contacts 25 connected across the cable pair. The leakage path presented across the cable pair lines 9 and 10 by the physical ringer 26 is represented by the resistor 27.

In practice, the A relay, which is pulsed by the physical channel dial contacts 24, is located in a line selector and is connected to talking battery 8 through a line finder (not shown). The A relay coil windings 12A and 12B are directly connected to talking battery 8 in FIG. 1 for convenience of illustration. The lines 9 and 10 of the cable pair are connected to disconnect circuit 4 through associated lines 9A and 10A. Line 10 and the negative terminal of the talking battery 8 are grounded. Telephones (not shown) of other physical subscriber circuits may be connected to the cable pair extensions 9B and 10B.

The circuit 5 for charging the local battery 6 may be one of those described in copending application entitled, Battery Charging Circuit for Subscriber Carrier Equipment, by Neale A. Zellmer Ser. No. 230,619, filed Mar. 1, 1972 and assigned to the assignee of this invention. The charging circuits disclosed in this copending case comprise an inductor for storing energy and a switching transistor for alternately blocking and passing a current from the lines 9 and 10 of the cable pair through the inductor to charge local battery 6. In practice, the switching transistor may open and close at a rate such that it appears like a pulse generator having a pulse repetition frequency of approximately 100 kHz.

Figure 4:
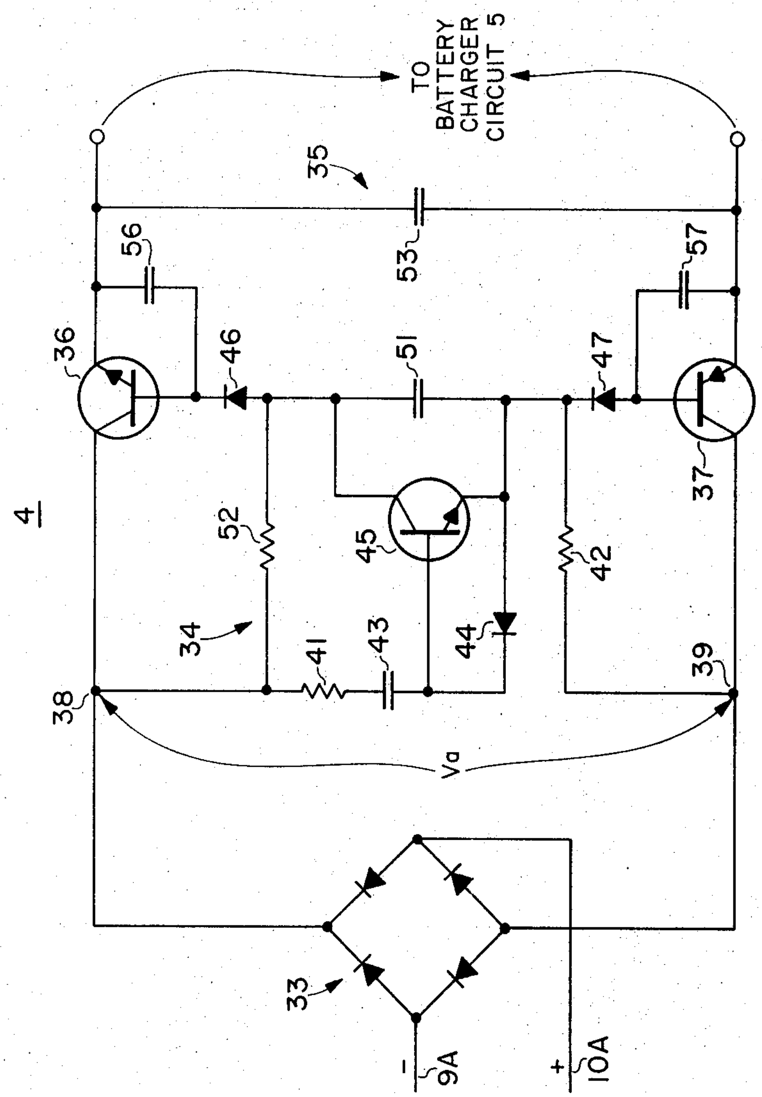
FIG. 4 is a detailed schematic diagram of a preferred embodiment of a disconnect circuit in accordance with this invention.
Figure 2:
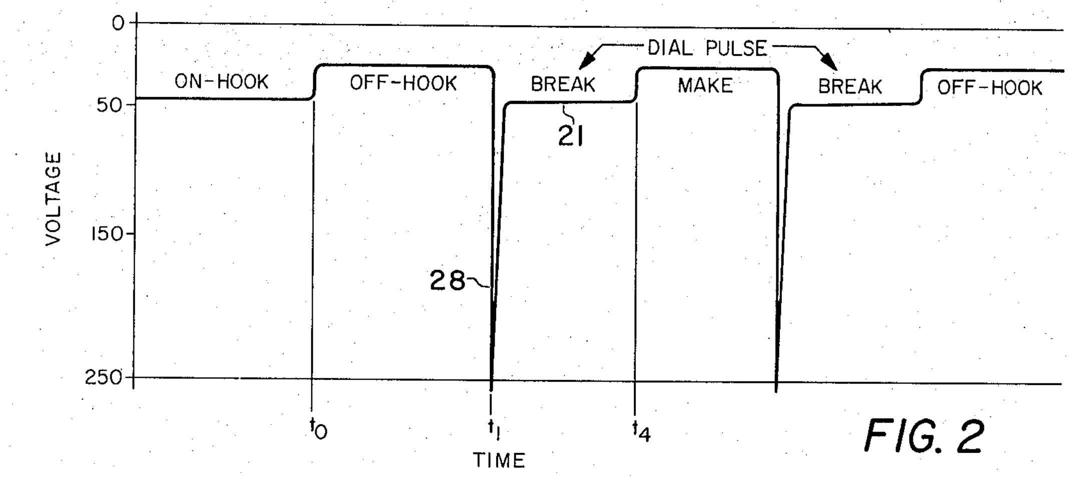
FIG. 2 is a curve representing the voltage across a cable pair as a physical subscriber handset goes off-hook and the number 2 is dialed.
Figure 3:
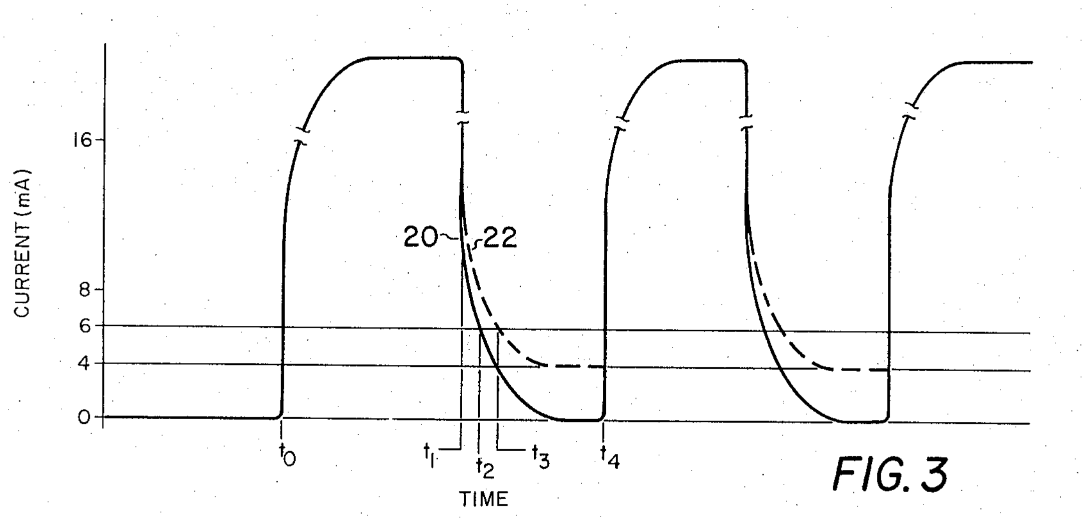
FIG. 3 is curves 20 and 22 representing the line current in the A-pulsing relay coil windings of a line selector in a central office for leakage currents on the cable pair of 0 and 4 milliamperes, respectively.

Disconnect circuit 4 is shown in detail in FIG. 4 and comprises a diode bridge circuit 33, off-hook to on-hook transition detection circuit 34, delay circuit 35, and a pair of switching transistors 36 and 37. Bridge circuit 33 is connected through the cable pair to talking battery 8 and through transistors 36 and 37 to charging circuit 5. The diode bridge 33 ensures that the local battery 6 is connected to the cable pair with the correct polarity regardless of the polarity of the talking battery voltage on lines 9 and 10. The voltage produced by bridge 33 is the applied voltage $V_a$ between points 38 and 39 which is shown in FIG. 4. The transistors 36 and 37 are switches that isolate the charging circuit 5 from the talking battery 8 whenever base drive current is removed therefrom by the operation of detection circuit 34 and the delay circuit 35.

Figure 5:
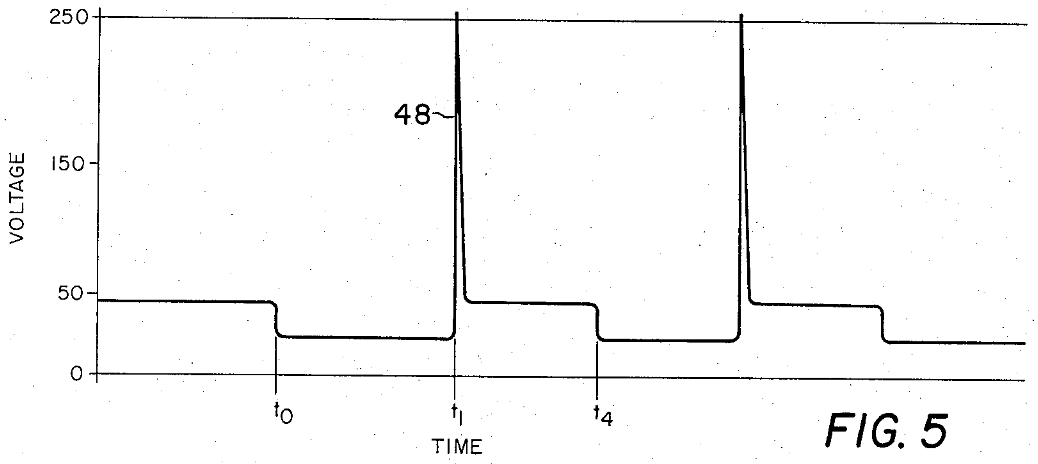
FIG. 5 is a curve representing the applied voltage $V_1$ in the disconnect circuit in FIG. 4.

The detection circuit 34 comprises resistors 41 and 42, capacitor 43, and diode 44 which are connected in series across the diode bridge, and a control transistor 45. Diode 44 is connected across the base-emitter junction of transistor 45 to protect this junction and to provide a discharge path for capacitor 43. The collector and emitter electrodes of control transistor 45 are connected through diodes 46 and 47 to the base electrodes of transistors 36 and 37, respectively. These diodes 46 and 47 protect the base-emitter junctions of the associated switching transistors by preventing application thereto of reverse voltages that exceed the breakdown voltages of these junctions. Control transistor 45 is caused to conduct by the off-hook to on-hook transient voltage 48 at time $t_1$ in FIG. 5 to cause circuit 34 to detect initiation of a dial pulse. Transistor 45 conducts for a time interval that is a function of the amplitude and duration of transient voltage 48, its gain, and the time constant of resistors 41 and 42 and capacitor 43.

Delay circuit 35 comprises capacitor 51 which is connected across the emitter and collector electrodes of control transistor 45; resistors 42 and 52 which determine the base drive current to transistors 37 and 36, respectively, and the charging rate of capacitor 51; and capacitor 53 which is connected across the emitter electrodes of the switching transistors 36 and 37. Capacitors 56 and 57 bypass the base and emitter electrodes of transistors 36 and 37, respectively, to make these transistors operate as chokes to provide a filtering function during steady-state operation to isolate the battery charger pulses produced by circuit 5 from the lines. A transistor with a capacitor between its base and emitter electrodes resists sudden changes of collector current analogous to an inductor. In this way the capacitors 56 and 57 permit the switching transistors to operate as very high series impedances which isolate the charging circuit 5 from the lines during the off-hook to on-hook transistion at time $t_1$. In this application the values of capacitors 56 and 57 are chosen large enough to cooperate with capacitor 53 and the associated switching transistors to filter the high frequency pulses from circuit 5 but small enough to permit operation of the disconnect circuit. The value of capacitor 53 is chosen as large as practicable. The values of resistors 42 and 52 and capacitor 51 are selected to maintain the switching transistors operating in the linear region and out of saturation.

Conduction of transistor 45 causes capacitor 51 to discharge an amount that is a function of the level and duration of base drive to the control transistor 45 and the gain thereof. Capacitor 51 discharges sufficiently to drive transistors 36 and 37 into cut-off to block the line current from the charging circuit 5. The time delay for capacitor 51 to charge to a level sufficient to drive transistors 36 and 37 back into conduction is a function of the time constant of resistors 42 and 52 and capacitor 51, and the charge on capacitor 53. The charge on this capacitor 53 is drained by the battery charger circuit 5 to charge the local battery when the switching transistors 36 and 37 are cut off. Since the charging of capacitor 51 is not a function of the gain of the control transistor 45 (which is not utilized in charging capacitor 51), it may take several hundred times longer to drive the switching transistors 36 and 37 into conduction than it did to drive them into cut-off.

When the subscriber carrier equipment is initially connected to the system, the applied voltage $V_a$ across the diode bridge causes capacitor 43 to charge through resistors 41 and 42 and the base-emitter junction of control transistor 45 until the voltage across capacitor 43 and resistor 42 are approximately equal to the voltage $V_a$. Then transistor 45 opens and capacitor 51 charges through resistors 42 and 52 and biases switching transistors 36 and 37 into conduction when the difference between the voltages across capacitors 51 and 53 exceeds the approximately 2.4 volts required to turn on the two silicon diodes 46 and 47 and the two base-emitter diodes of the switching transistors which are connected in series. Capacitor 53 also charges toward the applied voltage $V_a$ during conduction of the switching transistors. When the operation of the disconnect circuit 4 is stabilized prior to time $t_0$ and the voltage on lines 9 and 10 is 48 volts, for example, typical values of the applied $V_a$ and the voltages across capacitors 43, 51, and 53 are approximately 47, 43, 38, and 35 volts, respectively.

Prior to time $t_0$ with the subscriber handset on-hook, control transistor 45 is cut off and switching transistors 36 and 37 are conducting to pass a current to circuit 5 for charging local battery 6. During this time, the switching transistors 36 and 37 effectively present high inductances in series with the lines 9 and 10 which, together with capacitor 53, comprise a low-pass filter that attenuates high-frequency signal transmission from the battery charging circuit 5 to the cable pair. When the physical subscriber handset 23 goes off-hook at time $t_0$ in order to dial the number 2, for example, the line voltage drops to drive transistor 45 deeper into cut-off. Transistors 36 and 37 continue to conduct unless the line voltage drops below about 15 volts and the charger circuit 5 stops operation. Capacitor 53 discharges by supplying current to circuit 5 to establish a new equilibrium voltage that is below the new line voltage by an amount that is dependent on the current drain of charge circuit 5.

Release of the dial in the physical subscriber handset 23 at time $t_1$ opens the dial contacts 24 and the transient voltage 48 appears across points 38 and 39. In practice, the transient voltage 48 may have a magnitude of hundreds of volts and a duration of approximately 5 milliseconds. Since capacitor 43 cannot charge instantaneously, the voltage spike 48 forces current through capacitor 43, resistors 41 and 42, and the control transistor 45 base-emitter diode. Capacitor 43 charges toward the peak value of this applied voltage 48 and control transistor 45 is turned on as long as a charging current is flowing. Capacitor 43 charges until the transient voltage 48 rises through the peak value thereof and decreases to a value that is approximately equal to the voltage across the capacitor, e.g., when this voltage is approximately 100 volts. As the applied voltage falls below this value, diode 44 conducts to discharge capacitor 43 to its quiescent value and to cut off control transistor 45. During conduction of transistor 45, the delay capacitor 51 discharges therethrough to cut off the switching transistors 36 and 37 when the difference in voltages across the capacitors 51 and 53 is less than the sum of the voltage drops across the base-emitter junctions of the switching transistors and diodes 46 and 47. Capacitors 56 and 57 delay this cut-off for a short time by discharging through the switching transistor base-emitter diodes. With the switching transistors 36 and 37 cut off, capacitor 53 discharges to provide a drive current to circuit 5 for charging the local battery 6.

When the voltage across capacitor 43 is slightly less than the applied voltage $V_a$, control transistor 45 is biased into cut-off and capacitor 51 charges through resistors 42 and 52 toward the line voltage. When the voltage across the delay capacitor 51 exceeds the voltage across the filter capacitor 53 by approximately 2.4 volts which is the sum of the four diode voltage drops of the switching transistors and associated diodes, the switching transistors again conduct. The time interval that the switching transistors 36 and 37 are turned off is primarily determined by the time for the voltage on capacitor 51 to exceed the voltage on capacitor 53 by 2.4 volts while the former capacitor 51 charges through resistors 42 and 52 and the latter discharges through the battery charging circuit 5. Capacitors 51 and 53 continue to charge until the voltages across them reach their quiescent levels of approximately 38 and 35 volts, respectively, or until this cycle of operation is again repeated. This time interval that the switching transistors 36 and 37 are turned off in response to the transient voltage 48 is adjusted to be greater than (1) the duration of this transient voltage and (2) the time required to open the A-relay contacts 14 when there is no leakage current on the cable pair. In practice, this time interval may be many times larger than the duration of the transient voltage. Thus, it is seen from the above description that circuit 5 effectively automatically disconnects the charging circuit 5 from the cable pair in response to a transient voltage 48 at the start of a dial pulse to remove the battery charging current from lines 9 and 10 during the off-hook to on-hook transition at time $t_1$ to ensure rapid opening of the A-relay contacts 14.

In an embodiment of this invention that was built and tested, the duration of the transient voltage 48 was measured to be approximately 5 milliseconds, the time constant associated with capacitor 43 was approximately 4 milliseconds for causing the control transistor 45 to conduct for approximately 3 milliseconds to discharge delay capacitor 51, the time constant of capacitor 53 was 20 milliseconds, and the time constant of delay capacitor 51 was 440 milliseconds, for maintaining the switching transistors 36 and 37 cut off for approximately 20 milliseconds after detection of a dial pulse. The gain of the control transistor 45 in this circuit was approximately 100. In this embodiment of the invention, the values of capacitors 51 and 53 were both 10 $\mu$farad. Thus, capacitor 53 has more effect on the turn-on time of switching transistors 36 and 37 than the capacitor 51 and resistors 42 and 52 (since the time constants of capacitors 53 and 51 are 20 and 400 milliseconds, respectively). Although the value of capacitor 53 could be increased to make capacitor 51 control the turn-on time of the switching transistors, this may be impractical since capacitor 53 would then be physically very large. Although it is only necessary to open the switches 36 and 37 for a few milliseconds, until the A-relay contacts 14 open, the charging time of capacitors 51 and 53 may be selected to keep the switching transistors 36 and 37 cut off for the duration of the dial pulse. Measurements at the central office showed a reduction in dial pulse distortion of from 20 percent to less than 4 percent when this invention was employed.

In an alternate embodiment of this invention for operation of an unbalanced line, the resistor 42, diode 47, capacitor 57, and switching transistor 37 are omitted from the circuit.

What is claimed is:

1. Apparatus for automatically disconnecting a local subscriber carrier battery charging circuit that is connected through a cable pair to a central office power source from the latter, for a prescribed time interval, after initiation of a dial pulse by a telephone of a physical circuit, for reducing dial pulse distortion comprising:

first means for selectively connecting the charging circuit to the cable pair and thus to the power source, said first means comprising a first transistor having collector and emitter electrodes connected in series between a line of the cable pair and a first input terminal of the charging circuit, and having a base electrode;

a first semiconductor diode having one terminal connected to said first transistor base electrode; and second means connecting the other line of the cable pair to a second input terminal of the charging circuit;

third means for detecting a transient voltage occurring on the cable pair on initiation of a dial pulse in the telephone of the physical circuit, the transient voltage being of a limited duration that is much less than the duration of the dial pulse; and fourth means responsive to operation of said third means for opening said first means at the start of the dial pulse and holding said first means open to disconnect the local battery charging circuit from the central office power source for a prescribed time interval, that is greater than the duration of the transient voltage, following detection of initiation of the dial pulse, said fourth means comprising a first resistor, a first capacitor, and fifth means connecting said first resistor and first capacitor in series across the cable pair with the junction of said first resistor and first capacitor connected to the other terminal of said first diode.

the charge on said first capacitor from the central office power source maintaining said first transistor conducting during quiescent conditions prior to the telephone of the physical circuit producing a dial pulse.

2. Apparatus according to claim 1 wherein said third means comprises a second transistor having a base electrode, and having collector and emitter electrodes connected across said first capacitor, a second resistor, a second capacitor, said second resistor and second capacitor being connected in series between the one line of the cable pair and said second transistor base electrode, and sixth means connected across said second transistor base-emitter junction for discharging said second capacitor, said second transistor conducting during a transient line voltage on initiation of a dial pulse for discharging said first capacitor to cut off said first transistor until said first capacitor charges to a level to again bias and first transistor into conduction.

3. Apparatus according to claim 2 wherein said sixth discharging means comprises a second semiconductor diode.

4. Apparatus according to claim 3 wherein said fourth means comprises a third capacitor connected between said first transistor output electrode that is connected to the charging circuit and said second connecting means, and a fourth capacitor bypassing said first transistor base-emitter junction for causing said first transistor to simulate an inductor during conduction thereof, said third capacitor and first transistor operating as a low-pass filter during conduction of the latter.

5. Apparatus according to claim 4 wherein the values of said first resistor and first capacitor are selected to maintain said first transistor conducting in the linear region and out of saturation during conduction thereof.

6. Apparatus according to claim 5 wherein said second connecting means comprises a third transistor having collector and emitter electrodes connected in series between the other line of the cable pair and the second input terminal of the charging circuit and having a base electrode, and a third diode having one terminal connected to said third transistor base electrode and the other terminal connected to said first capacitor terminal that is spaced from said first transistor, and said fourth means including a fifth capacitor connected across said third transistor base-emitter junction and a third resistor connected between said third transistor collector electrode and the other terminal of said third diode for producing a symmetrical disconnect circuit.

7. A two-port network for disconnecting a local subscriber battery charging circuit from a cable pair and a central office talking battery for a prescribed time interval after initiation of a dial pulse by a telephone of a physical circuit, comprising first and second switching transistors having emitter electrodes connected to different terminals of the output port, having collector electrodes connected to different terminals of the input port, and having base electrodes, first and second resistors, a first capacitor, first connecting means connecting said first resistor, first capacitor, and second resistor in series across the input port and connecting the respective junctions of said first capacitor with said first and second resistors to the base electrodes of said first and second switching transistors, respectively, a third transistor having collector and emitter electrodes connected to opposite terminals of said first capacitor and having a base electrode, a second capacitor, second connecting means connecting said second capacitor between one terminal of the input port and said third transistor base electrode, and third means connected across the base-emitter junction of said third transistor for discharging said second capacitor, said first and second switching transistors conducting to pass a charging current from the talking battery prior to the physical circuit telephone producing a dial pulse, said third transistor being responsive to a transient voltage on the leading edge of a dial pulse that is impressed across said second capacitor for discharging said first capacitor sufficiently to cut off said first and second switching transistors for a time interval greater than that required for the central office A-pulsing relay contacts to open during charging of said first capacitor.

8. The network according to claim 7 wherein said second means comprises a third resistor connected in series with said second capacitor.

9. The network according to claim 8 wherein said first means comprises first and second semiconductor diodes in the connections of terminals of said first capacitor to base electrodes of said first and second transistors, respectively.

10. The network according to claim 9 including a third capacitor connected across said first and second transistor emitter electrodes which are connected to terminals of the output port.

11. The network according to claim 10 wherein said first and second transistors operate in the linear region during conduction and including fourth and fifth capacitors connected across the respective base-emitter junctions of said first and second switching transistors for causing the latter to present inductive impedances during conduction thereof which cooperate with said third capacitor to operate as a low-pass filter.

12. The network according to claim 11 wherein said third means comprises a third semiconductor diode.

13. The network according to claim 11 wherein said third means comprises a fourth resistor.

* * * * *

UNITED STATES PATENT OFFICE
CERTIFICATE OF CORRECTION

Patent No. 3,780,228 Dated December 18, 1973

Inventor(s) James A. Stewart

It is certified that error appears in the above-identified patent and that said Letters Patent are hereby corrected as shown below:

Column 2, line 36, change "break point 21" to -- break period 21 --; same column, line 42, change "valve" to -- value --; same column, line 43, change "unit" to -- until --. Column 3, line 20, change "$V_1$" to -- $V_a$ --. Column 5, line 66, change "the" (second occurrence) to -- this --. Column 7, line 11, change "of" to -- on --; same column, claim 2, lines 66 and 67, after "between" change "the one line" to -- one of the lines --.

Signed and sealed this 9th day of April 1974.

(SEAL)
Attest:

EDWARD M.FLETCHER,JR.
Attesting Officer

C. MARSHALL DANN
Commissioner of Patents